US012676805B2

(12) United States Patent
Liu et al.

(10) Patent No.: US 12,676,805 B2
(45) Date of Patent: Jul. 7, 2026

(54) NETWORK REACHABILITY VERIFICATION METHOD AND APPARATUS, AND COMPUTER STORAGE MEDIUM

(71) Applicant: HUAWEI TECHNOLOGIES CO., LTD., Shenzhen (CN)

(72) Inventors: Zhongzhe Liu, Dongguan (CN); Hongjian Cai, Dongguan (CN); Lulin Wang, Shenzhen (CN); Jigang Zhou, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 488 days.

(21) Appl. No.: 18/181,818

(22) Filed: Mar. 10, 2023

(65) Prior Publication Data

US 2023/0216763 A1 Jul. 6, 2023

Related U.S. Application Data

(63) Continuation of application No. PCT/CN2021/117568, filed on Sep. 10, 2021.

(30) Foreign Application Priority Data

Sep. 11, 2020 (CN) .......................... 202010954718.X
Sep. 18, 2020 (CN) .......................... 202010987222.2

(51) Int. Cl.
*H04L 43/0811* (2022.01)
*H04L 45/00* (2022.01)

(52) U.S. Cl.
CPC .......... *H04L 43/0811* (2013.01); *H04L 45/66* (2013.01)

(58) Field of Classification Search
CPC ... H04L 12/751; H04L 12/741; H04L 12/185; H04L 12/4679; H04L 41/0806;
(Continued)

(56) References Cited

U.S. PATENT DOCUMENTS 11,516,321 B1 * 11/2022 Isaac ........................ H04L 45/50
2016/0119219 A1 * 4/2016 Fang ..................... H04L 41/122
370/392

(Continued)

OTHER PUBLICATIONS

Lizhao You et al:"Fast Configuration Change Impact Analysis for Network Overlay Data Center Networks." Aug. 3-4, 2020, Seoul, Republic of Korea. ACM, New York, NY, USA, 8 pages. https:// doi.org/10.1145/3411029.3411031. total 8 pages.

*Primary Examiner* — Iqbal Zaidi
(74) *Attorney, Agent, or Firm* — WOMBLE BOND DICKINSON (US) LLP

(57) ABSTRACT
A network reachability verification method and apparatus, and a computer storage medium are provided, and pertain to the field of network technologies. The method includes: obtaining a source interface and a destination interface that correspond to a virtual packet in a target network; and verifying reachability of the virtual packet in an overlay network based on a logical topology of a plurality of forwarding instances of a plurality of network devices in the target network, routing information of the plurality of forwarding instances, a source forwarding instance corresponding to the source interface, and a destination forwarding instance corresponding to the destination interface. In this way, single-layer reachability verification on the overlay network in the target network is implemented, and verification accuracy is high.

18 Claims, 5 Drawing Sheets

301

Obtain a source interface and a destination interface that correspond to a virtual packet in a target network

302

Verify reachability of the virtual packet in the overlay network based on a logical topology of a plurality of forwarding instances of a plurality of network devices in the target network, routing information of the plurality of forwarding instances, a source forwarding instance corresponding to the source interface, and a destination forwarding instance corresponding to the destination interface

(58) Field of Classification Search
CPC . H04L 67/1095; H04L 69/28; H04L 43/0811;
H04J 3/06; H04W 48/18; H04W 28/0268
See application file for complete search history.

(56)                  References Cited

U.S. PATENT DOCUMENTS

| | | |
|---|---|---|
| 2018/0115466 A1 | 4/2018 | Kazemian et al. |
| 2021/0234715 A1* | 7/2021 | Liu .................... H04L 41/0897 |

* cited by examiner

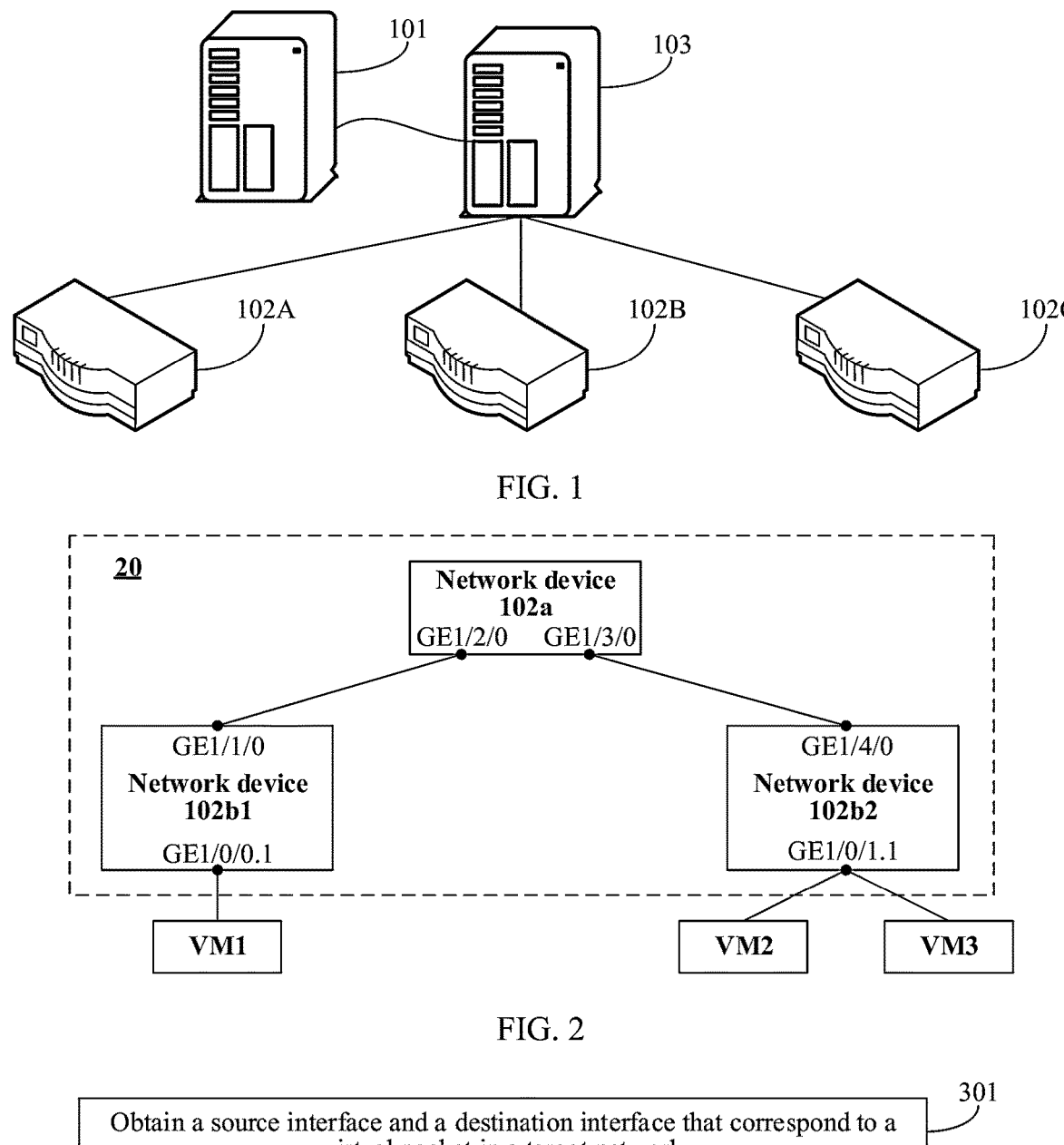

| |
|---|
| Obtain a source interface and a destination interface that correspond to a virtual packet in a target network |

301

| |
|---|
| Verify reachability of the virtual packet in the overlay network based on a logical topology of a plurality of forwarding instances of a plurality of network devices in the target network, routing information of the plurality of forwarding instances, a source forwarding instance corresponding to the source interface, and a destination forwarding instance corresponding to the destination interface |

NETWORK REACHABILITY VERIFICATION METHOD AND APPARATUS, AND COMPUTER STORAGE MEDIUM

CROSS-REFERENCE TO RELATED APPLICATIONS

This application is a continuation of International Application No. PCT/CN2021/117568, filed on Sep. 10, 2021, which claims priority to Chinese Patent Application No. 202010987222.2, filed on Sep. 18, 2020, which claims priority to Chinese Patent Application No. 202010954718.X, filed on Sep. 11, 2020. All of the aforementioned patent applications are hereby incorporated by reference in their entireties.

TECHNICAL FIELD

This application relates to the field of network technologies, and in particular, to a network reachability verification method and apparatus, and a computer storage medium.

BACKGROUND

As the scale of the Internet expands and a quantity of network protocols increases, packet forwarding behaviors in networks become more and more complex, easily causing various network problems. To ensure a network to reliably and efficiently run, network operation and maintenance personnel may master various network technologies and manually inspect and position problems and errors during running of the network. A network verification technology can help the network operation and maintenance personnel systematically analyze the network and quickly verify a series of route attributes in the network. Network reachability verification is an important verification technology for fault prevention, fault positioning, and fault root cause analysis on a network.

Currently, processing logic of packet forwarding performed by a network device in a network is usually modeled, to obtain a network model. During network reachability verification, based on a source interface, a destination interface, a source Internet protocol (IP) address, and a destination IP address that are to be verified, reachability verification is performed on the entire network based on the network model. An example process is as follows: The network model is used to verify whether a packet space formed by the source IP address and the destination IP address can be output from the destination interface after being input from the source interface, and a packet space that can be output from the destination interface is a reachable packet space.

However, currently, reachability verification can only be performed on the entire network, resulting in low verification accuracy.

SUMMARY

This application provides a network reachability verification method and apparatus, and a computer storage medium, which can resolve a problem that current network reachability verification accuracy is low.

According to a first aspect, a network reachability verification method is provided. The method includes: A verification device obtains a source interface and a destination interface that correspond to a virtual packet in a target network, where the target network includes an underlay network and an overlay network constructed above the underlay network. Then, the verification device verifies reachability of the virtual packet in the overlay network based on a logical topology of a plurality of forwarding instances of a plurality of network devices in the target network, routing information of the plurality of forwarding instances, a source forwarding instance corresponding to the source interface, and a destination forwarding instance corresponding to the destination interface.

In this application, the verification device implements reachability verification of the virtual packet in the overlay network based on the logical topology of the plurality of forwarding instances of the plurality of network devices in the target network, the routing information of the plurality of forwarding instances, the source forwarding instance corresponding to the source interface, and the destination forwarding instance corresponding to the destination interface. That is, single-layer reachability verification on the overlay network in the target network is implemented, and verification accuracy is high, so that fault positioning accuracy in the target network is high. In addition, the network reachability verification method provided in this application has high implementation flexibility.

In some embodiments, the verification device further obtains a first network graph model corresponding to the overlay network, where the first network graph model reflects the logical topology of the plurality of forwarding instances of the plurality of network devices in the target network. Therefore, an embodiment in which the verification device verifies reachability of the virtual packet in the overlay network based on a logical topology of a plurality of forwarding instances of a plurality of network devices in the target network, routing information of the plurality of forwarding instances, a source forwarding instance corresponding to the source interface, and a destination forwarding instance corresponding to the destination interface includes that the verification device verifies the reachability of the virtual packet in the overlay network based on the first network graph model, the routing information of the plurality of forwarding instances, the source forwarding instance, and the destination forwarding instance.

In this application, the verification device obtains the first network graph model corresponding to the overlay network. Because the first network graph model reflects the logical topology of the plurality of forwarding instances of the plurality of network devices in the target network, that is, reflects a logical topology of the overlay network, the verification device may verify the reachability of the virtual packet in the overlay network based on the first network graph model. In addition, the verification device may further output the first network graph model, to display the first network graph model on the verification device or another device, thereby implementing visualization of the logical topology of the overlay network.

In some embodiments, a method in which the verification device obtains a first network graph model corresponding to the overlay network includes that the verification device generates the first network graph model based on configuration information about the forwarding instances of the plurality of network devices in the target network and tunnel status information of the plurality of network devices, where the first network graph model includes a connection relationship between a plurality of forwarding instances in different network devices, and the forwarding instances in the different network devices are connected through a tunnel.

In some embodiments, the first network graph model may also be generated by another device and then sent to the verification device. Therefore, the method in which the verification device obtains a first network graph model corresponding to the overlay network includes that the verification device receives the first network graph model sent by the another device.

In some embodiments, the first network graph model further includes a connection relationship between a plurality of forwarding instances in a same network device.

In some embodiments, the configuration information about the forwarding instances of the network device includes one or more of a binding relationship between an interface of the network device and a layer 2 forwarding instance in the network device, a layer 3 virtual interface corresponding to the layer 2 forwarding instance in the network device, a binding relationship between the layer 3 virtual interface corresponding to the layer 2 forwarding instance in the network device and a layer 3 forwarding instance in the network device, network identifiers of the forwarding instances in the network device, or route targets of the forwarding instances in the network device.

In some embodiments, a method in which the verification device verifies reachability of the virtual packet in the overlay network includes that the verification device determines a logical reachable path and/or a logical unreachable path of the virtual packet in the overlay network.

In some embodiments, the logical reachable path of the virtual packet in the overlay network includes a logical path that meets the following condition: an end point of the logical path is the destination forwarding instance, and an outbound interface through which the virtual packet is forwarded from the destination forwarding instance is the destination interface.

In some embodiments, the logical unreachable path of the virtual packet in the overlay network includes a logical path that meets one or more of the following conditions: an end point of the logical path is the destination forwarding instance, and an outbound interface through which the virtual packet is forwarded from the destination forwarding instance is not the destination interface; the end point of the logical path does not have a next hop corresponding to the virtual packet in the overlay network, and the end point of the logical path is not the destination forwarding instance; and the logical path includes a loop.

In some embodiments, the verification device further verifies reachability between two tunnel endpoints of each tunnel on a target logical path in the underlay network, where the target logical path is a logical path of the virtual packet that includes a tunnel in the overlay network.

In this application, after obtaining a tunnel of the virtual packet on a logical path in the overlay network, the verification device may verify reachability between two tunnel endpoints of the tunnel in the underlay network, so that layered verification on the target network is implemented, and verification efficiency is high.

In some embodiments, a method in which the verification device verifies reachability between two tunnel endpoints of each tunnel on a target logical path in the underlay network includes that the verification device verifies the reachability between the two tunnel endpoints of each tunnel on the target logical path in the underlay network when the target logical path is the logical reachable path of the virtual packet in the overlay network.

In this application, the verification device may first obtain a logical path of the virtual packet in the overlay network, and then verify, after determining that the logical path is a reachable path of the virtual packet in the overlay network, reachability between two tunnel endpoints of each tunnel on the logical path in the underlay network, to determine whether the virtual packet can be reachable in the target network via a physical path corresponding to the logical path in the underlay network. When the logical path is an unreachable path of the virtual packet in the overlay network, the verification device determines that the virtual packet is also unreachable in the target network via the physical path corresponding to the logical path in the underlay network, and does not need to further verify the reachability of the tunnel on the logical path in the underlay network in this case, thereby saving computing resources.

In a possible embodiment, the method in which the verification device verifies reachability between two tunnel endpoints of each tunnel on a target logical path in the underlay network includes that the verification device verifies the reachability between the two tunnel endpoints of each tunnel on the target logical path in the underlay network based on a physical topology of the plurality of network devices in the target network and public network routing information of plurality of network devices.

In some embodiments, the verification device first obtains a second network graph model corresponding to the underlay network, where the second network graph model reflects the physical topology of the plurality of network devices in the target network; and then verifies the reachability between the two tunnel endpoints of each tunnel on the target logical path in the underlay network based on the second network graph model and the public network routing information of the plurality of network devices.

In another possible embodiment, the verification device verifies the reachability between the two tunnel endpoints of each tunnel on the target logical path in the underlay network based on a tunnel set, where the tunnel set includes one or more pairs of tunnel endpoints that are reachable in the underlay network.

In this embodiment, after obtaining a tunnel of the virtual packet on a logical path in the overlay network, the verification device may search for the tunnel set based on identifiers of two tunnel endpoints of the tunnel, to determine whether the two tunnel endpoints of the tunnel are reachable in the underlay network, so that verification efficiency is high.

In some embodiments, the verification device further obtains identifiers of a plurality of tunnel endpoints in the target network based on the configuration information of the plurality of network devices in the target network; then pairwise verifies reachability between the plurality of tunnel endpoints in the underlay network based on a physical topology of the plurality of network devices in the target network and public network routing information of the plurality of network devices; and finally generates the tunnel set based on a verification result of the reachability between every two tunnel endpoints in the plurality of tunnel endpoints in the underlay network.

In some embodiments, the tunnel set may also be generated by another device and then sent to the verification device.

In some embodiments, the verification device further obtains a second network graph model corresponding to the underlay network, where the second network graph model reflects the physical topology of the plurality of network devices in the target network. Correspondingly, a method in which the verification device pairwise verifies reachability between the plurality of tunnel endpoints in the underlay network based on a physical topology of the plurality of network devices in the target network and public network routing information of the plurality of network devices includes that the verification device pairwise verifies the reachability between the plurality of tunnel endpoints in the underlay network based on the second network graph model and the public network routing information of the plurality of network devices.

In this application, the verification device obtains the second network graph model corresponding to the underlay network. Because the second network graph model reflects the physical topology of the plurality of network devices in the target network, that is, reflects a physical topology of the underlay network, the verification device may verify reachability between two tunnel endpoints of a tunnel on a logical path in the underlay network based on the second network graph model. In addition, the verification device may further output the second network graph model, to display the second network graph model on the verification device or another device, thereby implementing visualization of the physical topology of the underlay network.

In some embodiments, a method in which the verification device obtains a second network graph model corresponding to the underlay network includes that the verification device generates the second network graph model based on a networking topology of the target network.

In some embodiments, the second network graph model may also be generated by another device and then sent to the verification device. Therefore, the method in which the verification device obtains a second network graph model corresponding to the underlay network includes that the verification device receives the second network graph model sent by the another device.

In some embodiments, the verification device further outputs a reachability verification result of the virtual packet in the target network, where the reachability verification result includes a reachable path set and/or an unreachable path set, where the reachable path set includes one or more pairs of reachable paths, and each pair of reachable paths includes the logical reachable path of the virtual packet in the overlay network and a physical reachable path corresponding to the logical reachable path in the underlay network; and the unreachable path set includes the logical unreachable path of the virtual packet in the overlay network and/or a physical unreachable path of the virtual packet in the underlay network.

In this application, the verification device may output the reachable path and/or the unreachable path of the virtual packet in the target network, to help network maintenance personnel perform troubleshooting.

In some embodiments, when the reachability verification result includes the unreachable path set, the reachability verification result further includes an unreachable root cause of an unreachable path in the unreachable path set.

In this application, the reachability verification result output by the verification device may include the unreachable root cause of the unreachable path in the unreachable path set, to help network operation and maintenance personnel perform fault positioning and maintenance.

In some embodiments, the verification device further obtains verification rule information, where the verification rule information includes a to-be-verified source address and a to-be-verified destination address; and then the verification device generates the virtual packet based on the verification rule information, where a source address of the virtual packet is determined based on the to-be-verified source address, and a destination address of the virtual packet is determined based on the to-be-verified destination address. The source address of the virtual packet may be the to-beverified source address, and the destination address of the virtual packet may be the to-be-verified destination address.

In some embodiments, the to-be-verified source address is a network segment address and/or the to-be-verified destination address is a network segment address.

In some embodiments, the verification rule information further includes one or more of a source port number, a destination port number, a transport layer protocol type, a necessary network device in the target network, a source interface identifier, or a destination interface identifier.

In some embodiments, the routing information of the forwarding instances includes one or more of a media access control table, a forwarding table, or an address resolution protocol table.

According to a second aspect, a network reachability verification apparatus is provided. The apparatus includes a plurality of function modules. The plurality of function modules interact with each other to implement the method according to the first aspect and the embodiments of the first aspect. The plurality of function modules may be implemented based on software, hardware, or a combination of software and hardware, and the plurality of function modules may be randomly combined or divided based on a specific embodiment.

According to a third aspect, a network reachability verification apparatus is provided, including a processor and a memory, where the memory is configured to store a computer program, and the computer program includes program instructions; and the processor is configured to invoke the computer program to implement the network reachability verification method according to the first aspect and the embodiments of the first aspect.

According to a fourth aspect, a computer storage medium is provided. The computer storage medium stores instructions, and when the instructions are executed by a processor of a computer device, the network reachability verification method according to the first aspect and the embodiments of the first aspect is implemented.

According to a fifth aspect, a chip is provided. The chip includes a programmable logic circuit and/or program instructions. When the chip runs, the method according to the first aspect and the embodiments of the first aspect is implemented.

Beneficial effects brought by the technical solutions provided in this application include at least the following.

In this application, the verification device implements reachability verification of the virtual packet in the overlay network based on the logical topology of the plurality of forwarding instances of the plurality of network devices in the target network, the routing information of the plurality of forwarding instances, the source forwarding instance corresponding to the source interface, and the destination forwarding instance corresponding to the destination interface. That is, single-layer reachability verification on the overlay network in the target network is implemented, and verification accuracy is high, so that fault positioning accuracy in the target network is high. In addition, after obtaining a tunnel of the virtual packet on a logical path in the overlay network, the verification device may verify reachability between two tunnel endpoints of the tunnel in the underlay network, so that layered verification on the target network is implemented, verification efficiency is high, and verification flexibility is high. In this way, effective verification on a similar network that runs a multi-layer IP such as a VXLAN protocol or a GRE protocol to perform encapsulation and decapsulation can be implemented.

BRIEF DESCRIPTION OF DRAWINGS

FIG. 1 is a schematic diagram of a structure of a network reachability verification system according to an embodiment of this application;

FIG. 2 is a schematic diagram of a networking topology of a communication network according to an embodiment of this application;

FIG. 3 is a schematic flowchart of a network reachability verification method according to an embodiment of this application;

DESCRIPTION OF EMBODIMENTS

Figure 4:
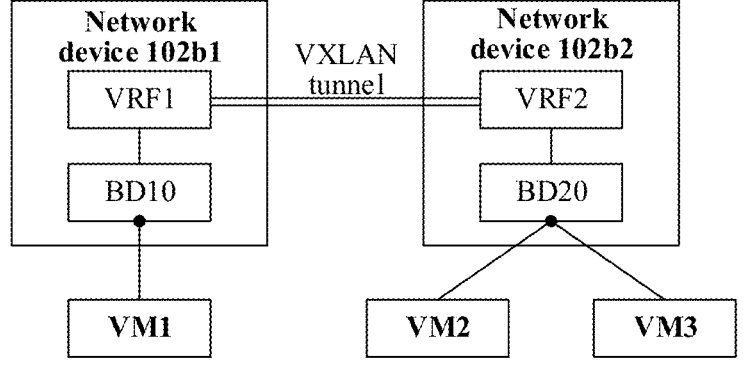
FIG. 4 is a schematic diagram of a first network graph model corresponding to an overlay network according to an embodiment of this application.

To make the objectives, technical solutions, and effects of this application clearer, the following further describes the embodiments of this application in detail with reference to the accompanying drawings.

FIG. 1 is a schematic diagram of a structure of a network reachability verification system according to an embodiment of this application. As shown in FIG. 1, the system includes a verification device 101 and network devices 102A to 102C (collectively referred to as a network device 102) in a communication network. A quantity of network devices in FIG. 1 is merely used as an example for description, and is not intended to limit the communication network in this embodiment of this application.

The verification device 101 may be one server, a server cluster including several servers, or a cloud computing service center. The network device 102 may be an entity communication device such as a switch or a router, or may be a virtual communication device such as a virtual switch or a virtual router. In some embodiments, still refer to FIG. 1. The system further includes a control device 103. The control device 103 is configured to manage and control the network device 102 in the communication network. The control device 103 may be a network controller, a network management device, a gateway, or another device having a control capability. The control device 103 may be one or more devices. The verification device 101 and the control device 103 are connected to each other by using a wired network or a wireless network. The control device 103 and the network device 102 are connected to each other by using a wired network or a wireless network.

In some embodiments, the control device 103 stores a networking topology of the communication network managed by the control device 103. The control device 103 is further configured to collect device information of the network device 102 in the communication network, including configuration information, routing information, tunnel status information, and the like. The configuration information of the network device includes interface configuration information, protocol configuration information, service configuration information, and/or the like such as a security control policy, which is represented as a security access control list (ACL). The routing information of the network device includes an address resolution protocol (ARP) table, a media access control (MAC) table, a routing table, and/or a forwarding table. The tunnel status information of the network device includes identifiers of tunnel endpoints and a status of a tunnel. The control device 103 may periodically collect the device information of the network device 102. In some embodiments, when the device information of the network device 102 changes, the network device 102 actively reports changed device information to the control device 103. The verification device 101 may obtain the networking topology of the communication network and the device information of the network device 102 via the control device 103. Certainly, the verification device 101 may also be integrated with the control device 103. This is not limited in this embodiment of this application.

The communication network provided in this embodiment of this application may be a data center network (DCN), a metropolitan area network, a wide area network, a campus network, or the like. A type of the communication network is not limited in this embodiment of this application. The communication network includes an underlay network and an overlay network constructed above the underlay network.

The underlay network may be a physical network formed by an Internet, a multi-protocol label switching (MPLS) network, a long term evolution (LTE) network, and/or the like. The underlay network includes a plurality of network devices, and the plurality of network devices are connected through a physical link.

The overlay network may be a logical network constructed on a basis of the underlay network by using a generic routing encapsulation (GRE) protocol, a virtual extensible local area network (VXLAN) protocol, a dynamic smart virtual private network (DSVPN) technology, an automatic virtual private network (Auto VPN) technology, and/or the like. The overlay network includes a tunnel (which may also be referred to as an overlay tunnel), and the tunnel is a virtual or logical link. Each tunnel corresponds to one or more paths in the underlay network, and each path is usually formed by a plurality of connected physical links in the underlay network.

The communication network provided in this embodiment of this application may use a two-layer network architecture or a three-layer network architecture. In the two-layer network architecture, the communication network includes an aggregation layer and an access layer. The communication network may also be referred to as a two-layer network. The aggregation layer is a high-speed switching backbone of the communication network, and the access layer is configured to access a workstation to the communication network. In the three-layer network architecture, the communication network includes a core layer, an aggregation layer, and an access layer. The communication network may also be referred to as a three-layer network. The core layer is a high-speed switching backbone of the communication network, the aggregation layer is configured to provide an aggregation connection (connecting the access layer and the core layer), and the access layer is configured to access a workstation to the communication network. The workstation may include a terminal, a server, a virtual machine (VM), or the like. In the following embodiments of this application, an example in which the communication network uses the two-layer network architecture is used for description.

For example, FIG. 2 is a schematic diagram of a networking topology of a communication network according to an embodiment of this application. As shown in FIG. 2, a communication network 20 includes a network device 102*a* located at an aggregation layer and network devices 102*b*1 and 102*b*2 located at an access layer. The communication network may be a fat tree (fat tree or leaf-spine) topology network. Therefore, the network device 102*a* is a spine switch, and both the network device 102*b*1 and the network device 102*b*2 are leaf switches.

Still refer to FIG. 2. The network device 102*a* has an interface GE1/2/0 and an interface GE1/3/0, the network device 102*b*1 has an interface GE1/0/0.1 and an interface GE1/1/0, and the network device 102*b*2 has an interface GE1/0/1.1 and an interface GE1/4/0. The interface GE1/0/0.1 on the network device 102*b*1 and the interface GE1/0/1.1 on the network device 102*b*2 are boundary interfaces. The network device 102*b*1 is connected to a VM1 through the interface GE1/0/0.1, and the network device 102*b*2 is connected to a VM2 and a VM3 through the interface GE1/0/1.1. The interface GE1/1/0 on the network device 102*b*1 is connected to the interface GE1/2/0 on the network device 102*a*. The interface GE1/4/0 on the network device 102*b*2 is connected to the interface GE1/3/0 on the network device 102*a*.

FIG. 3 is a schematic flowchart of a network reachability verification method according to an embodiment of this application. The method may be used in a verification device 101 in the system shown in FIG. 1. As shown in FIG. 3, the method includes the following operations.

Operation 301: Obtain a source interface and a destination interface that correspond to a virtual packet in a target network.

The target network includes an underlay network and an overlay network constructed above the underlay network. The virtual packet in this embodiment of this application is not a real packet, and the virtual packet is used for simulating the real packet to be transmitted in the target network. A plurality of fields in the virtual packet describe a header space (HS) (which may also be referred to as a packet space), and may represent a group of packets. By using an example in which the virtual packet includes a 5-tuple, each element in the 5-tuple may be one value or a set including a plurality of values. The 5-tuple includes a source IP address, a destination IP address, a source port, a destination port, and a transport layer protocol number. The source IP address or the destination IP address may be a specific IP address, or may be a network segment address (that is, an IP prefix), or may include a plurality of specific IP addresses. For example, if a source IP address=10.0.0.1, the source IP address is a specific IP address; and if a destination IP address={20.0.0.1,20.0.0.3,20.0.0.4}, the destination IP address includes three specific IP addresses. The source port number or the destination port number may be a specific port number or a port number range, or may include a plurality of specific port numbers. For example, if a source port number={1,3,5}, it indicates that there are three source ports; if a destination port number=0 to 255, it indicates that there are 256 destination ports ranging from 0 to 255. The transport layer protocol number may be a specific protocol number or a protocol number range, or may include a plurality of specific protocol numbers. For example, if a transport layer protocol number=7, it indicates that a transmission control protocol (TCP) is used.

For example, a 5-tuple in a virtual packet includes that a source IP address=10.0.0.1, a destination IP address=20.0.0.1, a source port number=0 to 9, a destination port number=12 to 15, and a transport layer protocol number=7. The virtual packet represents a group of packets whose source IP addresses, destination IP addresses, and transport layer protocols are the same. In the group of packets, a source port number of each packet is a value in 0 to 9, a destination port number is a value in 12 to 15, and a quantity of the group of packets is 10*4=40.

In another example, a 5-tuple in a virtual packet includes that a source IP address=10.0.0.1, a destination IP address=20.0.0.1, a source port number=0 to 9, a destination port number=12 to 15, and a transport layer protocol number=7. The virtual packet represents only one packet whose elements in the 5-tuple are all example values.

In some embodiments, the verification device obtains verification rule information, where the verification rule information includes a to-be-verified source address and a to-be-verified destination address. The verification device generates the virtual packet based on the verification rule information. A source address of the virtual packet is determined based on the to-be-verified source address, and a destination address of the virtual packet is determined based on the to-be-verified destination address. The verification rule information may be input by a user to the verification device. In some embodiments, the source address of the virtual packet is the to-be-verified source address, and the destination address of the virtual packet is the to-be-verified destination address.

In some embodiments, the to-be-verified source address is a network segment address and/or the to-be-verified destination address is a network segment address. The verification device may generate a virtual packet based on the verification rule information, where a source address of the virtual packet is the to-be-verified source address, and a destination address of the virtual packet is the to-be-verified destination address, that is, the source address and/or the destination address of the virtual packet may be a network segment address. In some embodiments, the verification device may generate a plurality of virtual packets based on the verification rule information. For example, the to-be-verified source address in the verification rule information is a network segment address, including m valid host addresses, and the to-be-verified destination address is a network segment address, including n valid host addresses. The verification device may generate m*n virtual packets based on the verification rule information, where a source address of each virtual packet is a valid host address in the to-be-verified source address, and a destination address is a valid host address in the to-be-verified destination address. Both m and n are positive integers.

In some embodiments, the verification rule information further includes one or more of a source port number, a destination port number, a transport layer protocol type, a necessary network device in the target network, a source interface identifier, or a destination interface identifier. The source port number, the destination port number, the transport layer protocol type, a to-be-verified source IP address, and a to-be-verified destination IP address form the 5-tuple of the virtual packet. The transport layer protocol type may be a TCP, a user datagram protocol (UDP), or the like. The necessary network device in the target network indicates a network device that the virtual packet necessarily passes through in the target network. The source interface identifier indicates an inbound interface of the virtual packet in the target network, and the destination interface identifier indicates an outbound interface of the virtual packet in the target network.

In some embodiments, there may be one or more source interfaces corresponding to the virtual packet in the target network, and the virtual packet may enter the target network from any source interface; and there may also be one or more destination interfaces corresponding to the virtual packet in the target network, and the virtual packet may be forwarded out of the target network from any destination interface. For example, the virtual packet may be transmitted by using an equal-cost multipath (ECMP) mechanism. In this embodiment of this application, an example in which the virtual packet corresponds to one source interface and one destination interface in the target network is mainly used for description.

For example, in the verification rule information, the to-be-verified source IP address is 10.0.0.1/32, the to-be-verified destination IP address is 20.0.0.0/24 (a network segment address), and the transport layer protocol number is 7 (corresponding to the TCP). It is assumed that the target network is the communication network 20 shown in FIG. 2, an IP address of a VM1 is 10.0.0.1, an IP address of a VM2 is 20.0.0.1, and an IP address of a VM3 is 20.0.0.2. It can be learned based on device access information of the target network that, the to-be-verified source IP address 10.0.0.1 is the IP address of the VM1, and the to-be-verified source IP address accesses the target network from an interface GE1/0/0.1 of a network device 102b1; and valid host addresses that belong to a subnet of the to-be-verified destination IP address 20.0.0.0/24 in the target network include the IP address 20.0.0.1 of the VM2 and the IP address 20.0.0.2 of the VM3, and the to-be-verified destination IP address is forwarded out of the target network from an interface GE1/0/1.1 of a network device 102b2. In a possible embodiment, the verification device generates a virtual packet based on the verification rule information. A source IP address of the virtual packet is 10.0.0.1, destination IP addresses are 20.0.0.1 and 20.0.0.2, a transport layer protocol number is 7, and the virtual packet may be indicated as [10.0.0.1, {20.0.0.1,20.0.0.2}; 7]; and a source interface corresponding to the virtual packet is GE1/0/0.1, a corresponding destination interface is GE1/0/1.1, and the virtual packet is used for verifying reachability from the VM1 to the VM2 and the VM3. In another possible embodiment, the verification device generates two virtual packets based on the verification rule information. A source IP address of one virtual packet is 10.0.0.1, a destination IP address is 20.0.0.1, a transport layer protocol number is 7, and the virtual packet may be indicated as [10.0.0.1, 20.0.0.1; 7]; and a source interface corresponding to the virtual packet is GE1/0/0.1, a corresponding destination interface is GE1/0/1.1, and the virtual packet is used for verifying reachability from the VM1 to the VM2. A source IP address of the other virtual packet is 10.0.0.1, a destination IP address is 20.0.0.2, a transport layer protocol number is 7, and the virtual packet may be indicated as [10.0.0.1,20.0.0.2; 7]; and a source interface corresponding to the virtual packet is GE1/0/0.1, a corresponding destination interface is GE1/0/1.1, and the virtual packet is used for verifying reachability from the VM1 to the VM3.

In some embodiments, when the verification rule information does not include the source port number and the destination port number, by default, the source port number in the virtual packet may be 0 to 65535, and the destination port number may be 0 to 65535. For example, the source port numbers and the destination port numbers of the virtual packet [10.0.0.1,{20.0.0.1,20.0.0.2}; 7], the virtual packet [10.0.0.1, 20.0.0.1; 7], and the virtual packet [10.0.0.1, 20.0.0.2; 7] are all 0 to 65535.

Operation 302: Verify reachability of the virtual packet in the overlay network based on a logical topology of a plurality of forwarding instances of a plurality of network devices in the target network, routing information of the plurality of forwarding instances, a source forwarding instance corresponding to the source interface, and a destination forwarding instance corresponding to the destination interface.

In some embodiments, the routing information of the forwarding instance includes one or more of a MAC table, a forwarding table, or an ARP table. A network device is configured with one or more forwarding instances. One forwarding instance corresponds to one group of locally valid routing information on the network device. Each forwarding instance in a same network device works independently, to implement routing isolation. The network device may include a layer 2 forwarding instance (an L2VPN instance) and/or a layer 3 forwarding instance (an L3VPN instance). The layer 2 forwarding instance corresponds to layer 2 routing information on the network device, for example, the MAC table; and the layer 3 forwarding instance corresponds to layer 3 routing information on the network device, for example, the forwarding table. In a VXLAN, the L2VPN instance may also be referred to as a bridge domain (BD) instance (corresponding to a layer 2 forwarding domain); and the L3VPN instance may also be referred to as a virtual routing forwarding (VRF) instance (corresponding to a layer 3 forwarding domain). The source forwarding instance corresponding to the source interface and the destination forwarding instance corresponding to the destination interface are usually layer 2 forwarding instances.

In some embodiments, the verification device may obtain a first network graph model corresponding to the overlay network, where the first network graph model reflects the logical topology of the plurality of forwarding instances of the plurality of network devices in the target network. Therefore, a method of operation 302 includes: verifying the reachability of the virtual packet in the overlay network based on the first network graph model, the routing information of the plurality of forwarding instances of the plurality of network devices in the target network, the source forwarding instance, and the destination forwarding instance.

In this embodiment of this application, the verification device obtains the first network graph model corresponding to the overlay network. Because the first network graph model reflects the logical topology of the plurality of forwarding instances of the plurality of network devices in the target network, that is, reflects a logical topology of the overlay network, the verification device may verify the reachability of the virtual packet in the overlay network based on the first network graph model. In addition, the verification device may further output the first network graph model, to display the first network graph model on the verification device or another device, thereby implementing visualization of the logical topology of the overlay network.

In some embodiments, a method in which the verification device obtains a first network graph model corresponding to the overlay network includes that the verification device generates the first network graph model based on configuration information about the forwarding instances of the plurality of network devices in the target network and tunnel status information of the plurality of network devices. The first network graph model includes a connection relationship between a plurality of forwarding instances in different network devices, and the forwarding instances in the different network devices are connected through a tunnel. In some embodiments, when two network devices are respectively configured as two tunnel endpoints of one tunnel, a connection relationship between a plurality of forwarding instances in the network devices includes a connection relationship between layer 2 forwarding instances in the two network devices and/or a connection relationship between layer 3 forwarding instances in the two network devices, and the connection relationship is established based on the tunnel.

In some embodiments, the first network graph model further includes a connection relationship between a plurality of forwarding instances in a same network device. When a network device includes a layer 2 forwarding instance and a layer 3 forwarding instance, the layer 2 forwarding instance and the layer 3 forwarding instance may be connected to each other.

In some embodiments, the configuration information about the forwarding instances of the network device includes one or more of a binding relationship between an interface of the network device and a layer 2 forwarding instance in the network device, a layer 3 virtual interface corresponding to the layer 2 forwarding instance in the network device, a binding relationship between the layer 3 virtual interface corresponding to the layer 2 forwarding instance in the network device and a layer 3 forwarding instance in the network device, network identifiers of the forwarding instances in the network device, or route targets of the forwarding instances in the network device. The layer 3 virtual interface is used as a layer 3 gateway, and the layer 3 virtual interface may be configured in the network device, or may be configured in another device. In the VXLAN, the layer 3 virtual interface is a BD-based logical interface, which may be referred to as a vbdif for short; and the network identifiers of the forwarding instances in the network device are VXLAN network identifiers (VNI), the VNIs are used for distinguishing VXLAN segments, and virtual machines in different VXLAN segments cannot directly perform two-layer communication. Each forwarding instance is configured with a route target, which may also be referred to as a vpn-target. The route target is an extended community attribute of a border gateway protocol (BGP). Each forwarding instance may be configured with two types of route targets: an export route target and an import route target. A local device and a peer device can exchange BGP routes only when an export route target (eRT for short) configured with a forwarding instance of the local device is the same as an import route target (iRT for short) configured with a forwarding instance of the peer device. In some embodiments, one or more route targets are configured with one forwarding instance. The verification device determines, based on the network identifiers of the forwarding instances and/or the route targets of the forwarding instances, whether there is a connection relationship between two forwarding instances.

For example, the overlay network in the target network runs a VXLAN protocol. Still refer to the example in operation 301. A VXLAN tunnel endpoint (VTEP) 1 is configured in the network device 102*b*1, and an IP address of the VTEP1 is 1.1.1.1; and a VTEP2 is configured in the network device 102*b*2, and an IP address of the VTEP2 is 2.2.2.2. A VXLAN tunnel connection is established between the network device 102*b*1 and the network device 102*b*2 based on the VTEP1 and the VTEP2. A tunnel is unidirectional. Usually, two tunnels in opposite directions are established between two network devices to implement bidirectional communication. It is assumed that a BD instance and a VRF instance are configured in both the network device 102*b*1 and the network device 102*b*2. An identifier of the BD instance in the network device 102*b*1 is 10, BD10 for short, and the VRF instance in the network device 102*b*1 is referred to as VRF1 for short; and an identifier of the BD instance in the network device 102*b*2 is 20, BD20 for short, and the VRF instance in the network device 102*b*2 is referred to as VRF2 for short. Configuration information about the forwarding instances of the network device 102*b*1 includes that GE1/0/0.1 is bound to the BD10, the BD10 corresponds to a vbdif10, and the vbdif10 is bound to the VRF1. Tunnel status information of the network device 102*b*1 includes: the IP address of the VTEP1: 1.1.1.1, the IP address of the VTEP2: 2.2.2.2, and the VTEP1→the VTEP2: up, to indicate that a status of a tunnel in a direction from the VTEP1 to the VTEP2 is available. Configuration information about the forwarding instances of the network device 102*b*2 includes that GE1/0/1.1 is bound to the BD20, the BD20 corresponds to a vbdif20, and the vbdif20 is bound to the VRF2. Tunnel status information of the network device 102*b*2 includes: the IP address of the VTEP2: 2.2.2.2, the IP address of the VTEP1: 1.1.1.1, and the VTEP2→the VTEP1: up, to indicate that a status of a tunnel in a direction from the VTEP2 to the VTEP1 is available. It is assumed that a route target of the VRF1 matches a route target of the VRF2, and a VNI of the BD10 is different from a VNI of the BD20. Therefore, the VRF1 and the VRF2 are connected to each other through a tunnel, there is no connection relationship between the BD10 and the BD20, and the first network graph model corresponding to the overlay network in the target network may be shown in FIG. 4. The VM1 accesses the BD10 of the network device 102*b*1, and the BD10 of the network device 102*b*1 is connected to the VRF1 of the network device 102*b*1; and both the VM2 and the VM3 access the BD20 of the network device 102*b*2, the BD20 of the network device 102*b*2 is connected to the VRF2 of the network device 102*b*2, and the VRF1 of the network device 102*b*1 is connected to the VRF2 of the network device 102*b*2 through a VXLAN tunnel.

Certainly, the first network graph model may also be generated by another device and then sent to the verification device. Therefore, in some embodiments, the method in which the verification device obtains a first network graph model corresponding to the overlay network includes that the verification device receives the first network graph model sent by the another device. A manner in which the verification device obtains the first network graph model is not limited in this embodiment of this application.

In some embodiments, the method of operation 302 includes that the verification device determines a logical reachable path and/or a logical unreachable path of the virtual packet in the overlay network based on the logical topology of the plurality of forwarding instances of the plurality of network devices in the target network (or the first network graph model), the routing information of the plurality of forwarding instances, the source forwarding instance, and the destination forwarding instance.

In some embodiments, the logical reachable path of the virtual packet in the overlay network includes a logical path that meets the following condition: an end point of the logical path is the destination forwarding instance, and an outbound interface through which the virtual packet is forwarded from the destination forwarding instance is the destination interface. The logical unreachable path of the virtual packet in the overlay network includes a logical path that meets one or more of the following conditions: an end point of the logical path is the destination forwarding instance, and an outbound interface through which the virtual packet is forwarded from the destination forwarding instance is not the destination interface; the end point of the logical path does not have a next hop corresponding to the virtual packet in the overlay network, and the end point of the logical path is not the destination forwarding instance; and the logical path includes a loop. The logical path includes the loop, that is, the logical path meets the following condition: a target node that a virtual packet reaches for a plurality of times exists on the logical path, and inbound interfaces through which the virtual packet reaches the target node for the plurality of times are the same and/or outbound interfaces through which the virtual packet is forwarded from the target node for the plurality of times are the same. The target node may be a forwarding instance.

For example, a simulated transmission path of the virtual packet in the overlay network is: a forwarding instance 1→a forwarding instance 2→a forwarding instance 3→a forwarding instance 4→a forwarding instance 2. If inbound interfaces through which the virtual packet reaches the forwarding instance 2 twice are the same and/or outbound interfaces through which the virtual packet is forwarded from the forwarding instance 2 twice are the same, it is determined that the simulated transmission path includes a loop: the forwarding instance 2→the forwarding instance 3→the forwarding instance 4→the forwarding instance 2, where the forwarding instance 2 may be referred to as a loop node. In this embodiment of this application, an $N^{th}$ loop node on the simulated transmission path may be used as the end point of the logical path of the virtual packet in the overlay network, where N is an integer greater than 1. For example, if a value of N is 2, the simulated transmission path of the virtual packet in the overlay network is: the forwarding instance 1→the forwarding instance 2→the forwarding instance 3→the forwarding instance 4→the forwarding instance 2.

In this embodiment of this application, a method in which the verification device determines a logical reachable path and/or a logical unreachable path of the virtual packet in the overlay network may include that the verification device obtains one or more logical paths of the virtual packet in the overlay network based on the logical topology of the plurality of forwarding instances of the plurality of network devices in the target network (or the first network graph model), the routing information of the plurality of forwarding instances, and the source forwarding instance corresponding to the source interface, where an end point of the logical path does not have a next hop corresponding to the virtual packet in the overlay network, or the logical path includes a loop (where the end point of the logical path may be a repeated node that appears on the logical path for the first time). The verification device verifies, based on the destination forwarding instance, whether the logical path is the logical reachable path of the virtual packet in the overlay network.

In some embodiments, a method in which the verification device verifies, based on the destination forwarding instance, whether the logical path is the logical reachable path of the virtual packet in the overlay network includes: determining, when the logical path includes the destination forwarding instance, the outbound interface through which the virtual packet is forwarded from the destination forwarding instance based on routing information of the destination forwarding instance and the destination address of the virtual packet; determining, when the outbound interface through which the virtual packet is forwarded from the destination forwarding instance is the destination interface, that the logical path is the logical reachable path of the virtual packet in the overlay network; and determining, when the outbound interface through which the virtual packet is forwarded from the destination forwarding instance is not the destination interface, that the logical path is the logical unreachable path of the virtual packet in the overlay network; or determining, when the logical path does not include the destination forwarding instance, that the logical path is the logical unreachable path of the virtual packet in the overlay network.

For example, Table 1 shows a forwarding table corresponding to the VRF1 in FIG. 4, Table 2 shows a forwarding table corresponding to the BD10 in FIG. 4 (where the forwarding table is obtained by conversion based on a MAC table and an ARP table that correspond to the BD10), and an IP address of the vbdif10 corresponding to the BD10 is 10.0.0.254/255.255.255.0. Table 3 shows a forwarding table corresponding to the VRF2 in FIG. 4, Table 4 shows a forwarding table corresponding to the BD20 in FIG. 4 (where the forwarding table is obtained by conversion based on a MAC table and an ARP table that correspond to the BD20), and an IP address of the vbdif20 corresponding to the BD20 is 20.0.0.254/255.255.255.0. "/255.255.255.0" is a subnet mask.

TABLE 1

| Destination IP | Next hop | Outbound interface |
|---|---|---|
| 10.0.0.0/24 | 10.0.0.254 | vbdif10 |
| 20.0.0.1/32 | 2.2.2.2 | VXLAN tunnel |

TABLE 2

| Destination IP | Next hop | Outbound interface |
|---|---|---|
| 10.0.0.1/32 | / | GE1/0/0.1 |
| 0.0.0.0/0 | 10.0.0.254 | vbdif10 |

TABLE 3

| Destination IP | Next hop | Outbound interface |
|---|---|---|
| 20.0.0.0/24 | 20.0.0.254 | vbdif20 |
| 10.0.0.1/32 | 1.1.1.1 | VXLAN tunnel |

17

TABLE 4

| Destination IP | Next hop | Outbound interface |
|---|---|---|
| 20.0.0.1/32 | / | GE1/0/1.1 |
| 20.0.0.2/32 | / | GE1/0/1.1 |
| 0.0.0.0/0 | 20.0.0.254 | vbdif20 |

In a first example, for a virtual packet [10.0.0.1, 20.0.0.1; 7], a corresponding source interface is GE1/0/0.1, and a corresponding destination interface is GE1/0/1.1. GE1/0/0.1 is bound to the BD10, and GE1/0/1.1 is bound to the BD20. Therefore, a source forwarding instance corresponding to the virtual packet in the overlay network is the BD10, and a corresponding destination forwarding instance is the BD20. The virtual packet in the VM1 reaches the BD10 through the inbound interface GE1/0/1.1. It can be learned based on Table 2 that the virtual packet is forwarded through the outbound interface vbdif10 after reaching the BD10. Because the vbdif10 is bound to the VRF1, it can be learned with reference to the first network graph model shown in FIG. 4 that the virtual packet reaches the VRF1. It can be learned from Table 1 that the virtual packet is forwarded through the VXLAN tunnel after reaching the VRF1. It can be learned with reference to the first network graph model shown in FIG. 4 that the virtual packet forwarded through the VXLAN tunnel reaches the VRF2. It can be learned based on Table 3 that the virtual packet is forwarded through the outbound interface vbdif20 after reaching the VRF2. Because the vbdif20 is a layer 3 virtual interface corresponding to the BD20, it can be learned with reference to the first network graph model shown in FIG. 4 that the virtual packet reaches the BD20. That is, a logical path of the virtual packet in the overlay network is: the network device 102b1-the BD10→the network device 102b1-the VRF1→the network device 102b2-the VRF2→the network device 102b2-the BD20. The logical path includes the destination forwarding instance BD20, and it can be learned based on Table 4 that the virtual packet can be forwarded to the VM2 through the outbound interface GE1/0/1.1 after reaching the BD20. Therefore, the logical path "the network device 102b1-the BD10→the network device 102b1-the VRF1→the network device 102b2-the VRF2→the network device 102b2-the BD20" is a reachable path of the virtual packet [10.0.0.1, 20.0.0.1; 7] in the overlay network.

In a second example, for a virtual packet [10.0.0.1, 20.0.0.2; 7], a corresponding source interface is GE1/0/0.1, and a corresponding destination interface is GE1/0/1.1. GE1/0/0.1 is bound to the BD10, and GE1/0/1.1 is bound to the BD20. Therefore, a source forwarding instance corresponding to the virtual packet in the overlay network is the BD10, and a corresponding destination forwarding instance is the BD20. The virtual packet in the VM1 reaches the BD10 through the inbound interface GE1/0/1.1. It can be learned based on Table 2 that the virtual packet is forwarded through the outbound interface vbdif10 after reaching the BD10. Because the vbdif10 is bound to the VRF1, it can be learned with reference to the first network graph model shown in FIG. 4 that the virtual packet reaches the VRF1. After the virtual packet reaches the VRF1, because a forwarding entry corresponding to the destination IP being 20.0.0.2 does not exist in Table 1, the VRF1 does not forward the virtual packet. That is, a logical path of the virtual packet in the overlay network is: the network device 102b1-the BD10→the network device 102b1-the VRF1. Because the logical path does not include the destination forwarding instance BD20, the logical path "the network device 102b1-the BD10→the network device 102b1-the VRF1" is an unreachable path of the virtual packet [10.0.0.1, 20.0.0.2; 7] in the overlay network.

In a third example, for a virtual packet [10.0.0.1, {20.0.0.1,20.0.0.2}; 7], a corresponding source interface is GE1/0/0.1, and a corresponding destination interface is GE1/0/1.1. GE1/0/0.1 is bound to the BD10, and GE1/0/1.1 is bound to the BD20. Therefore, a source forwarding instance corresponding to the virtual packet in the overlay network is the BD10, and a corresponding destination forwarding instance is the BD20. The virtual packet in the VM1 reaches the BD10 through the inbound interface GE1/0/1.1. It can be learned based on Table 2 that the virtual packet is forwarded through the outbound interface vbdif10 after reaching the BD10. Because the vbdif10 is bound to the VRF1, it can be learned with reference to the first network graph model shown in FIG. 4 that the virtual packet reaches the VRF1. It can be learned based on Table 1 that, a packet whose destination IP is 20.0.0.1 is forwarded through the VXLAN tunnel, but there is no forwarding entry corresponding to the destination IP being 20.0.0.2 in Table 1. Therefore, the original virtual packet is split into two virtual sub-packets at the VRF1, where one virtual sub-packet is [10.0.0.1,20.0.0.1; 7], and the other virtual sub-packet is [10.0.0.1,20.0.0.2; 7]. The virtual sub-packet [10.0.0.1, 20.0.0.1; 7] continues to be forwarded. For this process, refer to the foregoing first example. A logical path 1 of the virtual sub-packet [10.0.0.1,20.0.0.1; 7] in the overlay network: "the network device 102b1-the BD10→the network device 102b1-the VRF1→the network device 102b2-the VRF2→the network device 102b2-the BD20" is finally obtained, and the logical path 1 is a logical reachable path of the virtual sub-packet [10.0.0.1,20.0.0.1; 7] in the overlay network. However, a logical path 2 of the virtual sub-packet [10.0.0.1,20.0.0.2; 7] in the overlay network: "the network device 102b1-the BD10→the network device 102b1-the VRF1" is a logical unreachable path. That is, the virtual packet [10.0.0.1,{20.0.0.1,20.0.0.2}; 7] has two logical paths in the overlay network, where the logical path 1 of the virtual sub-packet [10.0.0.1,20.0.0.1; 7] in the overlay network is the logical reachable path, and the logical path 2 of the virtual sub-packet [10.0.0.1,20.0.0.2; 7] in the overlay network is the logical unreachable path.

It may be understood that, if the virtual packet is split into a plurality of virtual sub-packets in a simulated transmission process, the logical reachable path of the virtual packet in the overlay network includes logical reachable paths of one or more virtual sub-packets in the overlay network, and the logical unreachable path of the virtual packet in the overlay network includes logical unreachable paths of the one or more virtual sub-packets in the overlay network. A logical reachable path or a logical unreachable path of each virtual sub-packet includes a transmission path (that is, a transmission path before splitting) of the virtual packet from which the virtual sub-packet is split and a transmission path (that is, a transmission path after splitting) of the virtual sub-packet. A logical reachable path of a virtual sub-packet in the overlay network includes a logical path that meets the following condition: an end point of the logical path is the destination forwarding instance, and an outbound interface through which the virtual sub-packet is forwarded from the destination forwarding instance is the destination interface. A logical unreachable path of a virtual sub-packet in the overlay network includes a logical path that meets one or more of the following conditions: an end point of the logical path is the destination forwarding instance, and an outbound interface through which the virtual sub-packet is forwarded from the destination forwarding instance is not the destination interface; the end point of the logical path does not have a next hop corresponding to the virtual sub-packet in the overlay network, and the end point of the logical path is not the destination forwarding instance; and the logical path includes a loop. In this embodiment of this application, a plurality of fields in the virtual sub-packet describe a header space, and may represent a packet or a group of packets. By using an example in which the virtual sub-packet includes a 5-tuple, each element in the 5-tuple may be one value or a set including a plurality of values.

In this embodiment of this application, the verification device implements reachability verification of the virtual packet in the overlay network based on the logical topology of the plurality of forwarding instances of the plurality of network devices in the target network, the routing information of the plurality of forwarding instances, the source forwarding instance corresponding to the source interface, and the destination forwarding instance corresponding to the destination interface. That is, single-layer reachability verification on the overlay network in the target network is implemented, and verification accuracy is high, so that fault positioning accuracy in the target network is high. In addition, the network reachability verification method provided in this embodiment of this application has high implementation flexibility.

In some embodiments, the verification device may further verify reachability between two tunnel endpoints of each tunnel on a target logical path in the underlay network, where the target logical path is a logical path of the virtual packet that includes a tunnel in the overlay network. In some embodiments, the verification device verifies the reachability between the two tunnel endpoints of each tunnel on the target logical path in the underlay network when the target logical path is the logical reachable path of the virtual packet in the overlay network.

In this embodiment of this application, after obtaining a tunnel of the virtual packet on a logical path in the overlay network, the verification device may verify reachability between two tunnel endpoints of the tunnel in the underlay network, so that layered verification on the target network is implemented, and verification efficiency is high. Further, the verification device may first obtain a logical path of the virtual packet in the overlay network, and then verify, after determining that the logical path is a reachable path of the virtual packet in the overlay network, reachability between two tunnel endpoints of each tunnel on the logical path in the underlay network, to determine whether the virtual packet can be reachable in the target network via a physical path corresponding to the logical path in the underlay network. When the logical path is an unreachable path of the virtual packet in the overlay network, the verification device determines that the virtual packet is also unreachable in the target network via the physical path corresponding to the logical path in the underlay network, and does not need to further verify the reachability of the tunnel on the logical path in the underlay network in this case, thereby saving computing resources.

In a first example embodiment of this application, the verification device performs on-demand verification on the reachability of the tunnel in the underlay network. A method in which the verification device verifies reachability between two tunnel endpoints of each tunnel on a target logical path in the underlay network includes that the verification device verifies the reachability between the two tunnel endpoints of each tunnel on the target logical path in the underlay network based on a physical topology of the plurality of network devices in the target network and public network routing information of plurality of network devices.

Each network device in the target network has corresponding public network routing information. The public network routing information includes a public network forwarding table. For example, Table 5 shows a public network forwarding table corresponding to the network device 102b1 in FIG. 2. An IP address of an interface GE1/1/0 of the network device 102b1 is 100.100.0.2/255.255.255.0. Table 6 shows a public network forwarding table corresponding to a network device 102a in FIG. 2. An IP address of an interface GE1/2/0 of the network device 102a is 100.100.0.1/255.255.255.0, and an IP address of an interface GE1/3/0 is 100.200.0.1/255.255.255.0. Table 7 shows a public network forwarding table corresponding to the network device 102b2 in FIG. 2. An IP address of an interface GE1/4/0 of the network device 102b2 is 100.200.0.2/255.255.255.0.

TABLE 5

| Destination IP | Next hop | Outbound interface |
| --- | --- | --- |
| 2.2.2.2/32 | 100.100.0.1 | GE1/1/0 |

TABLE 6

| Destination IP | Next hop | Outbound interface |
| --- | --- | --- |
| 1.1.1.1/32 | 100.100.0.2 | GE1/2/0 |
| 2.2.2.2/32 | 100.200.0.2 | GE1/3/0 |

TABLE 7

| Destination IP | Next hop | Outbound interface |
| --- | --- | --- |
| 1.1.1.1/32 | 100.200.0.1 | GE1/4/0 |

For example, refer to the foregoing first example. In the logical path "the network device 102b1-the BD10→the network device 102b1-the VRF1→the network device 102b2-the VRF2→the network device 102b2-the BD20" of the virtual packet [10.0.0.1,20.0.0.1; 7] in the overlay network, the network device 102b1-the VRF1 and the network device 102b2-the VRF2 are connected to each other through the VXLAN tunnel, and the VXLAN tunnel may be indicated as the VTEP1→the VTEP2. When the virtual packet is sent from the network device 102b1-the VRF1 to the network device 102b2-the VRF2, a VXLAN packet header is actually encapsulated on the underlay network. A source IP address in the VXLAN packet header is the IP address 1.1.1.1 of the VTEP1, and a destination IP address in the VXLAN packet header is the IP address 2.2.2.2 of the VTEP2. Based on Table 5 and Table 6, with reference to a physical topology of the network device 102b1, the network device 102a, and the network device 102b2, it can be learned that a physical path corresponding to the tunnel "the VTEP1→the VTEP2" in the underlay network is: the network device 102b1→the network device 102a→the network device 102b2, that is, the two tunnel endpoints VTEP1 and VTEP2 of the tunnel are reachable in the underlay network. It can be further concluded that the virtual packet [10.0.0.1, 20.0.0.1; 7] sent by the VM1 can reach the VM2 in the target network.

In a second example embodiment of this application, the verification device performs full verification on the reachability of the tunnel in the underlay network. A method in which the verification device verifies reachability between two tunnel endpoints of each tunnel on a target logical path in the underlay network includes that the verification device verifies the reachability between the two tunnel endpoints of each tunnel on the target logical path in the underlay network based on a tunnel set, where the tunnel set includes one or more pairs of tunnel endpoints that are reachable in the underlay network.

In some embodiments, the verification device obtains identifiers of a plurality of tunnel endpoints in the target network based on the configuration information of the plurality of network devices in the target network, where the identifiers of the tunnel endpoints may be IP addresses of the tunnel endpoints. Then, the verification device pairwise verifies reachability between the plurality of tunnel endpoints in the underlay network based on a physical topology of the plurality of network devices in the target network and public network routing information of the plurality of network devices; and generates the tunnel set based on a verification result of the reachability between every two tunnel endpoints in the plurality of tunnel endpoints in the underlay network.

The verification device may obtain, based on configuration information of all network devices in the target network, identifiers of all tunnel endpoints configured in the target network, and then generate a tunnel set including all tunnel endpoint pairs that are reachable in the underlay network. For a manner in which the verification device verifies the reachability between the two tunnel endpoints in the underlay network, refer to related descriptions in the foregoing first example embodiment. Details are not described herein again in this embodiment of this application.

Certainly, the tunnel set may also be generated by another device and then sent to the verification device. A manner in which the verification device obtains the tunnel set is not limited in this embodiment of this application.

In this embodiment, after obtaining a tunnel of the virtual packet on a logical path in the overlay network, the verification device may search for the tunnel set based on identifiers of two tunnel endpoints of the tunnel, to determine whether the two tunnel endpoints of the tunnel are reachable in the underlay network, so that verification efficiency is high.

In some embodiments, the verification device may obtain a second network graph model corresponding to the underlay network, where the second network graph model reflects the physical topology of the plurality of network devices in the target network. Therefore, in the foregoing first example embodiment, the verification device may verify the reachability between the two tunnel endpoints of each tunnel on the target logical path in the underlay network based on the second network graph model and the public network routing information of the plurality of network devices in the target network. In the foregoing second example embodiment, the verification device may pairwise verify the reachability between the plurality of tunnel endpoints in the underlay network based on the second network graph model and the public network routing information of the plurality of network devices in the target network.

In this embodiment of this application, the verification device obtains the second network graph model corresponding to the underlay network. Because the second network graph model reflects the physical topology of the plurality of network devices in the target network, that is, reflects a physical topology of the underlay network, the verification device may verify reachability between two tunnel endpoints of a tunnel on a logical path in the underlay network based on the second network graph model. In addition, the verification device may further output the second network graph model, to display the second network graph model on the verification device or another device, thereby implementing visualization of the physical topology of the underlay network.

In some embodiments, a method in which the verification device obtains a second network graph model corresponding to the underlay network includes that the verification device generates the second network graph model based on a networking topology of the target network.

Figure 5:
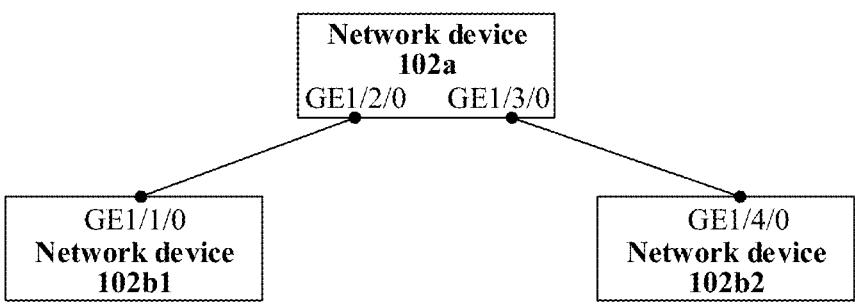
FIG. 5 is a schematic diagram of a second network graph model corresponding to an underlay network according to an embodiment of this application.

For example, the networking topology of the target network is shown in FIG. 2. Therefore, the second network graph model corresponding to the underlay network in the target network may be shown in FIG. 5. An interface GE1/1/0 on a network device 102*b*1 is connected to an interface GE1/2/0 on a network device 102*a*, and an interface GE1/3/0 on the network device 102*a* is connected to an interface GE1/4/0 on a network device 102*b*2.

Certainly, the second network graph model may also be generated by another device and then sent to the verification device. Therefore, in some embodiments, the method in which the verification device obtains a second network graph model corresponding to the underlay network includes that the verification device receives the second network graph model sent by the another device. A manner in which the verification device obtains the second network graph model is not limited in this embodiment of this application.

In some embodiments, the verification device may further output a reachability verification result of the virtual packet in the target network, where the reachability verification result includes a reachable path set and/or an unreachable path set, where the reachable path set includes one or more pairs of reachable paths, and each pair of reachable paths includes the logical reachable path of the virtual packet in the overlay network and a physical reachable path corresponding to the logical reachable path in the underlay network; and the unreachable path set includes a logical unreachable path of the virtual packet in the overlay network and/or a physical unreachable path of the virtual packet in the underlay network.

In some embodiments, the virtual packet may have one or more logical paths in the overlay network, and correspondingly, may have one or more physical paths in the underlay network. Therefore, a reachability verification result of a virtual packet may include only a reachable path set, or include only an unreachable path set, or include both the reachable path set and the unreachable path set.

For example, refer to the foregoing first example. A reachability verification result of the virtual packet [10.0.0.1, 20.0.0.1; 7] in the target network includes a reachable path set. The reachable path set includes one pair of reachable paths. The pair of reachable paths includes a logical reachable path "the network device 102*b*1-the BD10→the network device 102*b*1-the VRF1→the network device 102*b*2-the VRF2→the network device 102*b*2-the BD20" and a physical reachable path "the network device 102*b*1→the network device 102*a*→the network device 102*b*2" corresponding to the logical reachable path.

In another example, refer to the foregoing second example. A reachability verification result of the virtual packet [10.0.0.1,20.0.0.2; 7] in the target network includes an unreachable path set. The unreachable path set includes one logical unreachable path: "the network device 102*b*1-the BD10→the network device 102*b* 1-the VRF1".

In another example, refer to the foregoing third example. A reachability verification result of the virtual packet [10.0.0.1,{20.0.0.1,20.0.0.2}; 7] in the target network includes a reachable path set corresponding to the virtual sub-packet [10.0.0.1,20.0.0.1; 7] and an unreachable path set corresponding to the virtual sub-packet [10.0.0.1,20.0.0.2; 7]. The reachable path set includes one pair of reachable paths. The pair of reachable paths includes a logical reachable path "the network device 102*b*1-the BD10→the network device 102*b*1-the VRF1→the network device 102*b*2-the VRF2→the network device 102*b*2-the BD20" and a physical reachable path "the network device 102*b*1→the network device 102*a*→the network device 102*b*2" corresponding to the logical reachable path. The unreachable path set includes one logical unreachable path: "the network device 102*b*1-the BD10→the network device 102*b*1-the VRF1". It may be understood that, if the virtual packet is split into a plurality of virtual sub-packets in a simulated transmission process, the reachability verification result of the virtual packet may include reachable path sets and/or unreachable path sets of the virtual sub-packets obtained after splitting.

In this embodiment of this application, the verification device may output the reachable path and/or the unreachable path of the virtual packet in the target network, to help network maintenance personnel perform troubleshooting.

In some embodiments, when the reachability verification result includes the unreachable path set, the reachability verification result further includes an unreachable root cause of an unreachable path in the unreachable path set.

For example, refer to the foregoing second example. An unreachable root cause of the logical unreachable path "the network device 102*b*1-the BD10→the network device 102*b*1-the VRF1" corresponding to the virtual packet [10.0.0.1,20.0.0.2; 7] is that the VRF1 of the network device 102*b*1 does not have a forwarding entry that matches the virtual packet.

In this embodiment of this application, the reachability verification result output by the verification device may include the unreachable root cause of the unreachable path in the unreachable path set, to help network operation and maintenance personnel perform fault positioning and maintenance.

For example, the reachability verification result output by the verification device may be indicated as follows:

```
"
virtual packet:
{"protocolType": "7",
"srcIp": "10.0.0.1",
"srcMask": "255.255.255.255",
"dstIp": "20.0.0.1",
"dstMask": "255.255.255.255",
"srcPort": "0 to 65535",
"dstPort": "0 to 65535"}
  logical reachable path: the network device 102b1-the BD10->the
network device 102b1-the VRF1->the network device 102b2-the
VRF2->the network device 102b2-the BD20
"
```

```
"
virtual packet:
{"protocolType": "7",
"srcIp": "10.0.0.1",
"srcMask": "255.255.255.255",
"dstIp": "20.0.0.2",
```

-continued

```
"dstMask": "255.255.255.255",
"srcPort": "0 to 65535",
"dstPort": "0 to 65535"}
  logical unreachable path: the network device 102b1-the BD10->the
network device 102b1-the VRF1;
  unreachable root cause: the VRF1 lacks a forwarding entry
"
```

"protocolType" indicates a transmission protocol number, "srcIp" indicates the source IP address, "srcMask" indicates a subnet mask of the source IP address, "dstIp" indicates the destination IP address, "dstMask" indicates a subnet mask of the destination IP address, "srcPort" indicates a source port, and "dstPort" indicates a destination port.

A sequence of operations of the network reachability verification method provided in this embodiment of this application may be properly adjusted, or the operations may be correspondingly added or deleted according to a situation. Any variation method readily figured out by a person skilled in the art within the technical scope disclosed in this application shall fall within the protection scope of this application. For example, an embodiment of this application provides a layered verification method for a target network that includes two layers of networks: an underlay network and an overlay network. By analogy, the method may, in some embodiments, be configured to implement layered verification on a communication network that includes three or more layers of networks. Details are not described herein again in this embodiment of this application.

In summary, based on the network reachability verification method provided in this embodiment of this application, the verification device implements reachability verification of the virtual packet in the overlay network based on the logical topology of the plurality of forwarding instances of the plurality of network devices in the target network, the routing information of the plurality of forwarding instances, the source forwarding instance corresponding to the source interface, and the destination forwarding instance corresponding to the destination interface. That is, single-layer reachability verification on the overlay network in the target network is implemented, and verification accuracy is high, so that fault positioning accuracy in the target network is high. In addition, after obtaining a tunnel of the virtual packet on a logical path in the overlay network, the verification device may verify reachability between two tunnel endpoints of the tunnel in the underlay network, so that layered verification on the target network is implemented, verification efficiency is high, and verification flexibility is high. In this way, effective verification on a similar network that runs a multi-layer IP such as a VXLAN protocol or a GRE protocol to perform encapsulation and decapsulation can be implemented.

Figure 6:
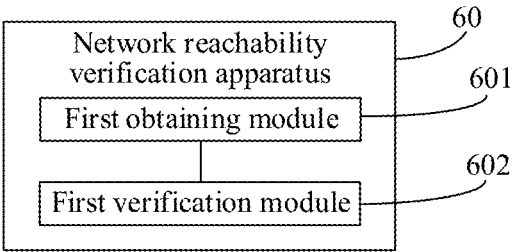
FIG. 6 is a schematic diagram of a structure of a network reachability verification apparatus according to an embodiment of this application.

FIG. 6 is a schematic diagram of a structure of a network reachability verification apparatus according to an embodiment of this application. The apparatus may be a verification device 101 in the system shown in FIG. 1. As shown in FIG. 6, an apparatus 60 includes:

a first obtaining module 601, configured to obtain a source interface and a destination interface that correspond to a virtual packet in a target network, where the target network includes an underlay network and an overlay network constructed above the underlay network; and a first verification module 602, configured to verify reachability of the virtual packet in the overlay network based on a logical topology of a plurality of forwarding instances of a plurality of network devices in the target network, routing information of the plurality of forwarding instances, a source forwarding instance corresponding to the source interface, and a destination forwarding instance corresponding to the destination interface.

In summary, in the network reachability verification apparatus provided in this embodiment of this application, the first verification module implements reachability verification of the virtual packet in the overlay network based on the logical topology of the plurality of forwarding instances of the plurality of network devices in the target network, the routing information of the plurality of forwarding instances, the source forwarding instance corresponding to the source interface, and the destination forwarding instance corresponding to the destination interface. That is, single-layer reachability verification on the overlay network in the target network is implemented, and verification accuracy is high, so that fault positioning accuracy in the target network is high.

Figure 7:
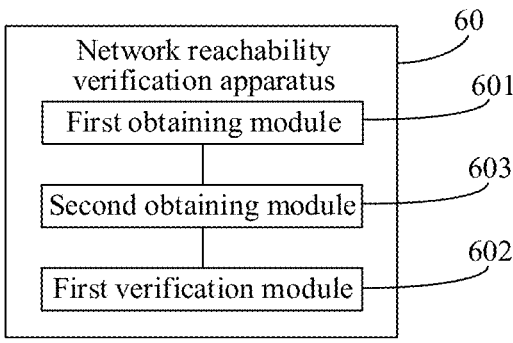
FIG. 7 is a schematic diagram of a structure of another network reachability verification apparatus according to an embodiment of this application.

In some embodiments, as shown in FIG. 7, the apparatus 60 further includes:

a second obtaining module 603, configured to obtain a first network graph model corresponding to the overlay network, where the first network graph model reflects the logical topology of the plurality of forwarding instances of the plurality of network devices in the target network. Correspondingly, the first verification module 602 is configured to verify the reachability of the virtual packet in the overlay network based on the first network graph model, the routing information of the plurality of forwarding instances, the source forwarding instance, and the destination forwarding instance.

In some embodiments, the second obtaining module 603 is configured to generate the first network graph model based on configuration information about the forwarding instances of the plurality of network devices in the target network and tunnel status information of the plurality of network devices, where the first network graph model includes a connection relationship between a plurality of forwarding instances in different network devices, and the forwarding instances in the different network devices are connected through a tunnel.

In some embodiments, the first network graph model further includes a connection relationship between a plurality of forwarding instances in a same network device.

In some embodiments, the configuration information about the forwarding instances of the network device includes one or more of a binding relationship between an interface of the network device and a layer 2 forwarding instance in the network device, a layer 3 virtual interface corresponding to the layer 2 forwarding instance in the network device, a binding relationship between the layer 3 virtual interface corresponding to the layer 2 forwarding instance in the network device and a layer 3 forwarding instance in the network device, network identifiers of the forwarding instances in the network device, or route targets of the forwarding instances in the network device.

In some embodiments, the first verification module 602 is configured to determine a logical reachable path and/or a logical unreachable path of the virtual packet in the overlay network.

In some embodiments, the logical reachable path of the virtual packet in the overlay network includes a logical path that meets the following condition: an end point of the logical path is the destination forwarding instance, and an outbound interface through which the virtual packet is forwarded from the destination forwarding instance is the destination interface.

In some embodiments, the logical unreachable path of the virtual packet in the overlay network includes a logical path that meets one or more of the following conditions: an end point of the logical path is the destination forwarding instance, and an outbound interface through which the virtual packet is forwarded from the destination forwarding instance is not the destination interface; the end point of the logical path does not have a next hop corresponding to the virtual packet in the overlay network, and the end point of the logical path is not the destination forwarding instance; and the logical path includes a loop.

Figure 8:
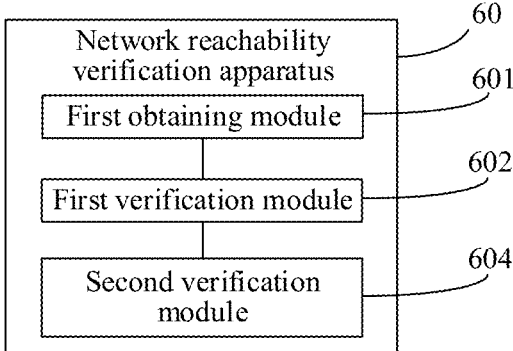
FIG. 8 is a schematic diagram of a structure of still another network reachability verification apparatus according to an embodiment of this application.

In some embodiments, as shown in FIG. 8, the apparatus 60 further includes:

a second verification module 604, configured to verify reachability between two tunnel endpoints of each tunnel on a target logical path in the underlay network, where the target logical path is a logical path of the virtual packet that includes a tunnel in the overlay network.

In some embodiments, the second verification module 604 is configured to: verify the reachability between the two tunnel endpoints of each tunnel on the target logical path in the underlay network when the target logical path is the logical reachable path of the virtual packet in the overlay network.

In some embodiments, the second verification module 604 is configured to: verify the reachability between the two tunnel endpoints of each tunnel on the target logical path in the underlay network based on a physical topology of the plurality of network devices in the target network and public network routing information of the plurality of network devices.

Figure 9:
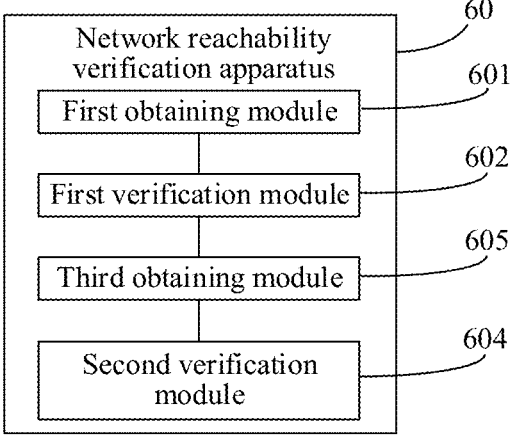
FIG. 9 is a schematic diagram of a structure of yet another network reachability verification apparatus according to an embodiment of this application.

In a first example embodiment of this application, as shown in FIG. 9, the apparatus 60 further includes a third obtaining module 605, configured to obtain a second network graph model corresponding to the underlay network, where the second network graph model reflects the physical topology of the plurality of network devices in the target network. Correspondingly, the second verification module 604 is configured to verify the reachability between the two tunnel endpoints of each tunnel on the target logical path in the underlay network based on the second network graph model and the public network routing information of the plurality of network devices.

In some embodiments, the second verification module 604 is configured to verify the reachability between the two tunnel endpoints of each tunnel on the target logical path in the underlay network based on a tunnel set, where the tunnel set includes one or more pairs of tunnel endpoints that are reachable in the underlay network.

Figure 10:
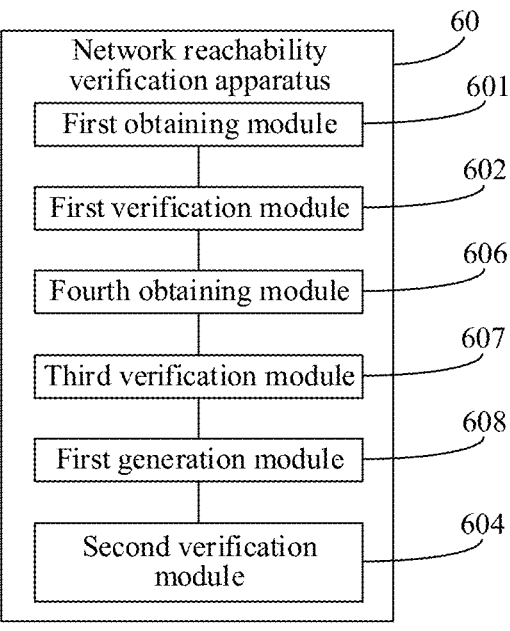
FIG. 10 is a schematic diagram of a structure of still yet another network reachability verification apparatus according to an embodiment of this application.

In some embodiments, as shown in FIG. 10, the apparatus 60 further includes:

a fourth obtaining module 606, configured to obtain identifiers of a plurality of tunnel endpoints in the target network based on the configuration information of the plurality of network devices in the target network; a third verification module 607, configured to pairwise verify reachability between the plurality of tunnel endpoints in the underlay network based on a physical topology of the plurality of network devices in the target network and public network routing information of the plurality of network devices; and a first generation module 608, configured to generate the tunnel set based on a verification result of the reachability between every two tunnel endpoints in the plurality of tunnel endpoints in the underlay network.

Figure 11:
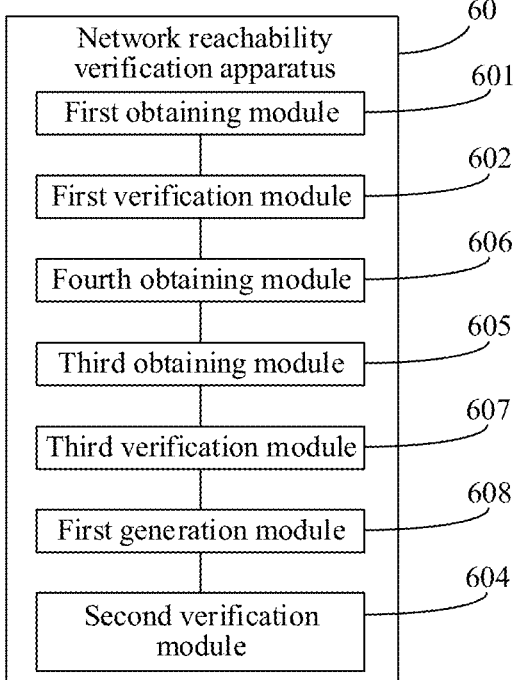
FIG. 11 is a schematic diagram of a structure of a network reachability verification apparatus according to another embodiment of this application.

In a second example embodiment of this application, as shown in FIG. 11, the apparatus 60 further includes a third obtaining module 605, configured to obtain a second network graph model corresponding to the underlay network, where the second network graph model reflects the physical topology of the plurality of network devices in the target network. Correspondingly, the third verification module 607 is configured to pairwise verify the reachability between the plurality of tunnel endpoints in the underlay network based on the second network graph model and the public network routing information of the plurality of network devices.

In some embodiments, the third obtaining module 605 is configured to generate the second network graph model based on a networking topology of the target network.

Figure 12:
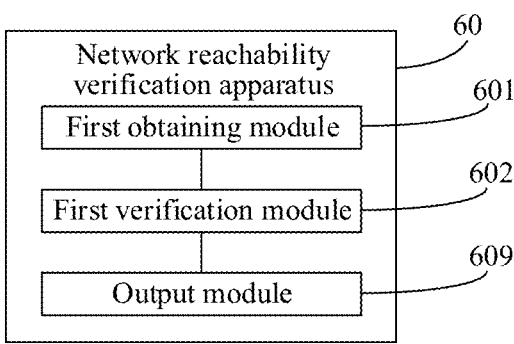
FIG. 12 is a schematic diagram of a structure of another network reachability verification apparatus according to another embodiment of this application.

In some embodiments, as shown in FIG. 12, the apparatus 60 further includes:

an output module 609, configured to output a reachability verification result of the virtual packet in the target network, where the reachability verification result includes a reachable path set and/or an unreachable path set, where the reachable path set includes one or more pairs of reachable paths, and each pair of reachable paths includes the logical reachable path of the virtual packet in the overlay network and a physical reachable path corresponding to the logical reachable path in the underlay network; and the unreachable path set includes the logical unreachable path of the virtual packet in the overlay network and/or a physical unreachable path of the virtual packet in the underlay network.

In some embodiments, when the reachability verification result includes the unreachable path set, the reachability verification result further includes an unreachable root cause of an unreachable path in the unreachable path set.

Figure 13:
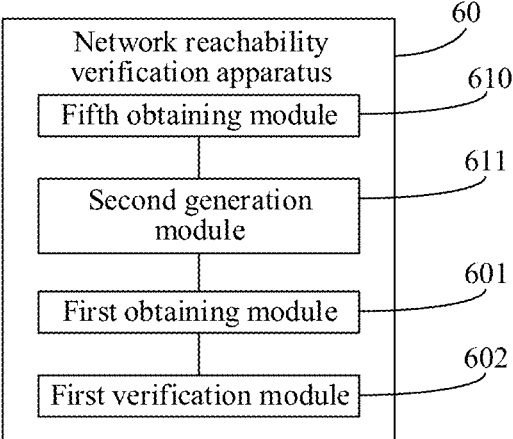
FIG. 13 is a schematic diagram of a structure of still another network reachability verification apparatus according to another embodiment of this application.

In some embodiments, as shown in FIG. 13, the apparatus 60 further includes:

a fifth obtaining module 610, configured to obtain verification rule information, where the verification rule information includes a to-be-verified source address and a to-be-verified destination address; and a second generation module 611, configured to generate the virtual packet based on the verification rule information, where a source address of the virtual packet is determined based on the to-be-verified source address, and a destination address of the virtual packet is determined based on the to-be-verified destination address.

In some embodiments, the to-be-verified source address is a network segment address and/or the to-be-verified destination address is a network segment address.

In some embodiments, the verification rule information further includes one or more of a source port number, a destination port number, a transport layer protocol type, a necessary network device in the target network, a source interface identifier, or a destination interface identifier.

In some embodiments, the routing information of the forwarding instances includes one or more of a media access control table, a forwarding table, or an address resolution protocol table.

In summary, in the network reachability verification apparatus provided in this embodiment of this application, the first verification module implements reachability verification of the virtual packet in the overlay network based on the logical topology of the plurality of forwarding instances of the plurality of network devices in the target network, the routing information of the plurality of forwarding instances, the source forwarding instance corresponding to the source interface, and the destination forwarding instance corresponding to the destination interface. That is, single-layer reachability verification on the overlay network in the target network is implemented, and verification accuracy is high, so that fault positioning accuracy in the target network is high. In addition, after obtaining a tunnel of the virtual packet on a logical path in the overlay network, the second verification module may verify reachability between two tunnel endpoints of the tunnel in the underlay network, so that layered verification on the target network is implemented, verification efficiency is high, and verification flexibility is high. In this way, effective verification on a similar network that runs a multi-layer IP such as a VXLAN protocol or a GRE protocol to perform encapsulation and decapsulation can be implemented.

For the apparatus in the foregoing embodiment, example manners of executing operations by each module are described in detail in embodiments related to the method, and details are not described herein.

Figure 14:
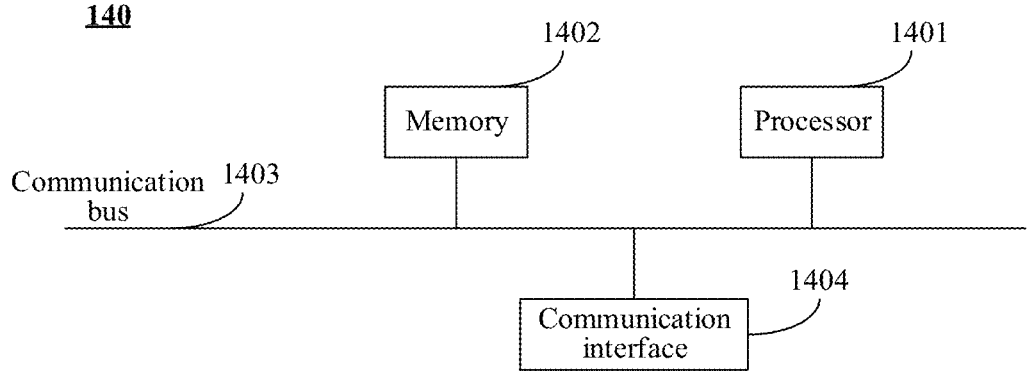
FIG. 14 is a block diagram of a network reachability verification apparatus according to an embodiment of this application.

FIG. 14 is a block diagram of a network reachability verification apparatus according to an embodiment of this application. As shown in FIG. 14, an apparatus 140 includes a processor 1401 and a memory 1402.

The memory 1402 is configured to store a computer program, and the computer program includes program instructions.

The processor 1401 is configured to invoke the computer program to implement the network reachability verification method according to the foregoing method embodiment.

In some embodiments, the apparatus 140 further includes a communication bus 1403 and a communication interface 1404.

The processor 1401 includes one or more processing cores, and the processor 1401 executes various functional applications and performs data processing by running the computer program.

The memory 1402 may be configured to store the computer program. In some embodiments, the memory may store an operating system and an application program unit that is required for at least one function. The operating system may be an operating system such as a real time operating system (RTX), LINUX, UNIX, WINDOWS, or OS X.

There may be a plurality of communication interfaces 1404, and the communication interface 1404 is configured to communicate with another storage device or network device.

The memory 1402 and the communication interface 1404 are respectively connected to the processor 1401 by using the communication bus 1403.

An embodiment of this application further provides a computer storage medium. The computer storage medium stores instructions, and when the instructions are executed by a processor of a computer device, the network reachability verification method according to the foregoing method embodiment is implemented.

A person of ordinary skill in the art may understand that all or some of the operations of the embodiments may be implemented by hardware or a program instructing related hardware. The program may be stored in a computer-readable storage medium. The storage medium may be a read-only memory, a magnetic disk, an optical disc, or the like.

In embodiments of this application, the terms "first", "second", and "third" are merely used for description, but cannot be understood as an indication or implication of relative importance.

The term "and/or" in this application describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The foregoing descriptions are only example embodiments of this application, but are not intended to limit this application. Any modification, equivalent replacement, or improvement made within the concept and principle of this application should fall within the protection scope of this application.

What is claimed is:

1. A network reachability verification method, wherein the method comprises:

obtaining a source interface and a destination interface that correspond to a virtual packet in a target network, wherein the target network comprises an underlay network and an overlay network above the underlay network;

verifying reachability of the virtual packet in the overlay network based on a logical topology of a plurality of forwarding instances of a plurality of network devices in the target network, routing information of the plurality of forwarding instances, a source forwarding instance corresponding to the source interface, and a destination forwarding instance corresponding to the destination interface; and obtaining a first network graph model corresponding to the overlay network, wherein the first network graph model reflects the logical topology of the plurality of forwarding instances of the plurality of network devices in the target network, wherein the verifying the reachability of the virtual packet in the overlay network based on the logical topology of the plurality of forwarding instances of the plurality of network devices in the target network, the routing information of the plurality of forwarding instances, the source forwarding instance corresponding to the source interface, and the destination forwarding instance corresponding to the destination interface comprises:

verifying the reachability of the virtual packet in the overlay network based on the first network graph model, the routing information of the plurality of forwarding instances, the source forwarding instance, and the destination forwarding instance.

2. The method according to claim 1, wherein the obtaining the first network graph model corresponding to the overlay network comprises:

generating the first network graph model based on configuration information about the forwarding instances of the plurality of network devices in the target network and tunnel status information of the plurality of network devices, wherein the first network graph model comprises a connection relationship between a plurality of forwarding instances in different network devices, and the plurality of forwarding instances in the different network devices are connected through a tunnel.

3. The method according to claim 2, wherein the first network graph model further comprises a connection relationship between a plurality of forwarding instances in a same network device.

4. The method according to claim 2, wherein the configuration information about the forwarding instances of the network device comprises one or more of a binding relationship between an interface of the network device and a layer 2 forwarding instance in the network device, a layer 3 virtual interface corresponding to the layer 2 forwarding instance in the network device, a binding relationship between the layer 3 virtual interface corresponding to the layer 2 forwarding instance in the network device and a layer 3 forwarding instance in the network device, network identifiers of the forwarding instances in the network device, or route targets of the forwarding instances in the network device.

5. The method according to claim 1, wherein the verifying the reachability of the virtual packet in the overlay network comprises:

determining a logical reachable path or a logical unreachable path of the virtual packet in the overlay network.

6. The method according to claim 1, wherein the method further comprises:

verifying reachability between two tunnel endpoints of each tunnel on a target logical path in the underlay network, wherein the target logical path is a logical path of the virtual packet that comprises a tunnel in the overlay network.

7. The method according to claim 6, wherein the verifying the reachability between the two tunnel endpoints of each tunnel on the target logical path in the underlay network comprises:

verifying the reachability between the two tunnel endpoints of each tunnel on the target logical path in the underlay network when the target logical path is a logical reachable path of the virtual packet in the overlay network.

8. The method according to claim 6, wherein the verifying the reachability between the two tunnel endpoints of each tunnel on the target logical path in the underlay network comprises:

verifying the reachability between the two tunnel endpoints of each tunnel on the target logical path in the underlay network based on a physical topology of the plurality of network devices in the target network and public network routing information of the plurality of network devices.

9. The method according to claim 6, wherein the verifying the reachability between the two tunnel endpoints of each tunnel on the target logical path in the underlay network comprises:

verifying the reachability between the two tunnel endpoints of each tunnel on the target logical path in the underlay network based on a tunnel set, wherein the tunnel set comprises one or more pairs of tunnel endpoints that are reachable in the underlay network.

10. The method according to claim 9, wherein the method further comprises:

obtaining identifiers of a plurality of tunnel endpoints in the target network based on configuration information of the plurality of network devices in the target network;

pairwise verifying reachability between the plurality of tunnel endpoints in the underlay network based on a physical topology of the plurality of network devices in the target network and public network routing information of the plurality of network devices; and generating the tunnel set based on a verification result of the reachability between every two tunnel endpoints in the plurality of tunnel endpoints in the underlay network.

11. A network reachability verification apparatus, wherein the apparatus comprises:

at least one processor; and at least one memory, coupled to the at least one processor and configured to store instructions that when executed by the at least one processor cause the apparatus to:

obtain a source interface and a destination interface that correspond to a virtual packet in a target network, wherein the target network comprises an underlay network and an overlay network above the underlay network;

verify reachability of the virtual packet in the overlay network based on a logical topology of a plurality of forwarding instances of a plurality of network devices in the target network, routing information of the plurality of forwarding instances, a source forwarding instance corresponding to the source interface, and a destination forwarding instance corresponding to the destination interface; and obtain a first network graph model corresponding to the overlay network, wherein the first network graph model reflects the logical topology of the plurality of forwarding instances of the plurality of network devices in the target network, wherein the reachability of the virtual packet in the overlay network is verified based on the first network graph model, the routing information of the plurality of forwarding instances, the source forwarding instance, and the destination forwarding instance.

12. The apparatus according to claim 11, wherein, when executed by the at least one processor, the instructions further cause the apparatus to:

generate the first network graph model based on configuration information about the plurality of forwarding instances of the plurality of network devices in the target network and tunnel status information of the plurality of network devices, wherein the first network graph model comprises a connection relationship between a plurality of forwarding instances in different network devices, and the forwarding instances in the different network devices are connected through a tunnel.

13. The apparatus according to claim 11, wherein, when executed by the at least one processor, the instructions further cause the apparatus to:

determine a logical reachable path or a logical unreachable path of the virtual packet in the overlay network.

14. The apparatus according to claim 11, wherein, when executed by the at least one processor, the instructions further cause the apparatus to:

verify reachability between two tunnel endpoints of each tunnel on a target logical path in the underlay network, wherein the target logical path is a logical path of the virtual packet that comprises a tunnel in the overlay network.

15. The apparatus according to claim 14, wherein, when executed by the at least one processor, the instructions further cause the apparatus to:

verify the reachability between the two tunnel endpoints of each tunnel on the target logical path in the underlay network when the target logical path is a logical reachable path of the virtual packet in the overlay network.

16. The apparatus according to claim 14, wherein, when executed by the at least one processor, the instructions further cause the apparatus to:

verify the reachability between the two tunnel endpoints of each tunnel on the target logical path in the underlay network based on a physical topology of the plurality of network devices in the target network and public network routing information of the plurality of network devices.

17. The apparatus according to claim 16, wherein, to verify the reachability between the two tunnel endpoints of each tunnel on the target logical path in the underlay network, the at least one processor is to:

verify the reachability between the two tunnel endpoints of each tunnel on the target logical path in the underlay network based on a tunnel set, wherein the tunnel set comprises one or more pairs of tunnel endpoints that are reachable in the underlay network.

18. A non-transitory computer storage medium, wherein the computer storage medium stores instructions, and when the instructions are executed by a processor of a computer device, the computer device is configured to:

obtain a source interface and a destination interface that correspond to a virtual packet in a target network, wherein the target network comprises an underlay network and an overlay network above the underlay network;

verify reachability of the virtual packet in the overlay network based on a logical topology of a plurality of forwarding instances of a plurality of network devices in the target network, routing information of the plurality of forwarding instances, a source forwarding instance corresponding to the source interface, and a destination forwarding instance corresponding to the destination interface; and obtain a first network graph model corresponding to the overlay network, wherein the first network graph model reflects the logical topology of the plurality of forwarding instances of the plurality of network devices in the target network, wherein the reachability of the virtual packet in the overlay network is verified based on the first network graph model, the routing information of the plurality of forwarding instances, the source forwarding instance, and the destination forwarding instance.

* * * * *